United States Patent [19]
Reddy

[11] Patent Number: 6,025,010
[45] Date of Patent: Feb. 15, 2000

[54] MULTIFUNCTIONAL SPREAD

[75] Inventor: Podutoori Ravinder Reddy, Columbia, Md.

[73] Assignee: Lipton, Division of Conopco, Inc., Englewood Cliffs, N.J.

[21] Appl. No.: 08/975,249

[22] Filed: Nov. 21, 1997

[51] Int. Cl.⁷ .................................................. A23D 7/00
[52] U.S. Cl. .......................................... 426/603; 426/602
[58] Field of Search ................................ 426/573, 602, 426/603

[56] References Cited

U.S. PATENT DOCUMENTS

| | | | |
|---|---|---|---|
| 4,536,408 | 8/1985 | Morehouse | 426/613 |
| 4,869,919 | 9/1989 | Lowery | 426/604 |
| 4,882,187 | 11/1989 | Izzo | 426/603 |
| 5,264,568 | 11/1993 | Yamada et al. . | |
| 5,344,824 | 9/1994 | Ohkuma et al. . | |
| 5,358,729 | 10/1994 | Ohkuma et al. . | |
| 5,364,652 | 11/1994 | Ohkuma et al. . | |
| 5,380,717 | 1/1995 | Ohkuma et al. . | |
| 5,410,035 | 4/1995 | Wakabayashi et al. . | |
| 5,430,141 | 7/1995 | Ohkuma et al. . | |
| 5,447,741 | 9/1995 | Goldman | 426/580 |
| 5,451,422 | 9/1995 | Cain | 426/602 |
| 5,472,728 | 12/1995 | Muller | 426/604 |
| 5,472,732 | 12/1995 | Ohkuma et al. . | |
| 5,505,981 | 4/1996 | Wakabayashi et al. . | |
| 5,536,523 | 7/1996 | Blauel | 426/603 |
| 5,554,407 | 9/1996 | Bodor | 426/602 |
| 5,558,897 | 9/1996 | Goldman | 426/573 |
| 5,614,245 | 3/1997 | Gupta | 426/601 |
| 5,753,295 | 5/1998 | Goldman | 426/618 |

FOREIGN PATENT DOCUMENTS

| | | |
|---|---|---|
| 0368451 | 5/1990 | European Pat. Off. . |
| 0443788 | 8/1991 | European Pat. Off. . |
| 0444891 | 9/1991 | European Pat. Off. . |

OTHER PUBLICATIONS

Gunston 1983 Lipids in Foods Chemistry Biochemistry and Technology Pergamon Press New York pp. 154–155.

*Primary Examiner*—Carolyn Paden

[57] ABSTRACT

The invention relates to a low fat spread with low water content for application in baking without effecting organoleptic properties for cold use, (that is, spreads). The compositions of the invention are good quality spreads at low fat levels in the range of about 30–60% fat. The compositions of the invention comprise non gelling hydrocolloids to provide optimum viscosity to the aqueous phase at a concentration which results in a fat continuous emulsion.

4 Claims, No Drawings

MULTIFUNCTIONAL SPREAD

FIELD OF THE INVENTION

This invention relates to low fat spreads with low water content. The low water content allows the spreads to be used in baking, without affecting the organoleptic properties when the spreads are used in cold uses, for example spread applications. Thus the spreads of the invention are multifunctional spreads.

BACKGROUND OF THE INVENTION

Traditional low fat spreads (40% fat and below) have water structuring agents added to the aqueous phase. The water structuring agents are either gelling or nongelling. The processes to manufacture low fat spreads are either conventional or by inversion processes. The levels of water structuring agents in a 40% fat spread could range from 1–6% and thus the water content in these spreads ranges from 52%–58%.

Low fat spreads have been improved over the years using new processes and choices of aqueous phase thickeners. These low fat spreads have excellent application for cold use and to some extent for hot use. The hot use is mostly restricted to hot toast. Even on hot toast, the toast tends to become soggy depending on the temperature of the toast and the total time after spreading.

With 40% fat in low fat spreads/margarine, the functionality for use in baking is reduced and thus the low fat spreads are not recommended for baking. This is partly due to low fat level and also due to high water content in these spreads. The high water content is normally a problem in baking, particularly with consumers trying to follow the recipes which call for 65–80% fat margarine/spreads. The water content in the recipes are not adjusted based on the low fat spreads. With one to one replacement of high fat spread with low fat spread in the traditional recipes as well as in the prepared bakery mixes available commercially, the result is a soggy dough in the case of cookies and a soggy batter in the case of cakes and muffins.

There have been attempts to produce low fat baking spread/margarine and to overcome the soggy dough/batter problem by replacing the water with any bulking agent. However, traditionally available bulking agents, which are soluble in water, tend to increase the viscosity of the aqueous phase. The increased viscosity of the aqueous phase leads to poor mouthfeel for cold use. The other approach that has been taken is to bind the water with humectants. Humectants which bind water replace part of the total water content. However, at the levels used these humectants generally affect taste, resulting in a product which is quite different than the normal spread. For example, sugars are good humectants but the resulting spread will be too sweet to be acceptable to the consumer.

Particular patents in this field are:
U.S. Pat. No. 5,264,568;
U.S. Pat. No. 5,430,141;
U.S. Pat. No. 5,358,729;
U.S. Pat. No. 5,472,732;
U.S. Pat. No. 5,364,652;
U.S. Pat. No. 5,344,824;
U.S. Pat. No. 5,380,717;
U.S. Pat. No. 5,410,035;
U.S. Pat. No. 5,505,981;
EP 0 368 451 B1;
EP 0 444 891 B1;
EP 0 443 788 B1;

SUMMARY OF THE INVENTION

The invention provides a low fat spread with low water content for application in baking without effecting organoleptic properties for cold use, (that is, spreads). The compositions of the invention are good quality spreads at low fat levels in the range of about 30–60% fat. The compositions of the invention comprise non gelling hydrocolloids to provide optimum viscosity to the aqueous phase at a concentration which results in a fat continuous emulsion. These hydrocolloids are bulking agents which are modified maltodextrins marketed under the trade name Fibersol. This bulking agent does not contribute significantly to the viscosity of the aqueous phase nor does it affect the taste or oral melt of the spread. It was used at levels (15–40%) which replaced water in a 40% fat spread and the resulting compositions resembled a 65–80% fat spread/margarine. The net result was a 40% spread without loss of quality for cold use and improved hot functionality. The spread can be used for baking without adjusting the water content of the recipe.

DETAILED DESCRIPTION OF THE INVENTION

The present invention relates to a low fat spread with low water content for application in baking without effecting organoleptic properties for cold use, (that is, spreads).The compositions of the invention are good quality spreads at low fat levels in the range of about 30–60% fat. The compositions of the invention comprise non gelling hydrocolloids to provide optimum viscosity to the aqueous phase at a concentration which results in a fat continuous emulsion. Even though there are a high amount of solids in these spreads the mouthfeel is not adversely affected. These hydrocolloids are bulking agents which are modified maltodextrins marketed under the trade name Fibersol. This bulking agent does not contribute significantly to the viscosity of the aqueous phase nor does it affect the taste or oral melt of the spread. It was used at levels (15–40%) which replaced water in a 40% fat spread and the resulting compositions resembled a 65–80% fat spread/margarine. The net result was a 40% spread without loss of quality for cold use and improved hot functionality. The spread can be used for baking without adjusting the water content of the recipe.

Description of Fibersol 2(E)®:

Fibersol 2(E)® is a maltodextrin of DE 6-10 processed from corn starch using hydrochloric acid and enzymes. The maltodextrin is partially digestible as the human digestive enzymes, salivary and pancreatic amylases are incapable of digesting Beta 1-2, Beta 1-3 and Beta 1-6 bonds.

Description of Hydrolyzed guar

As used herein, hydrolyzed guar means a guar gum which has been hydrolyzed enzymatically or chemically. An example of an enzymatic hydrolyzed guar is Benefiber® from Sandoz.

Unless otherwise indicated, %, means % by weight.

The starting materials recited in this specification are either known or can be prepared by known methods.

A stick margarine or spread can be prepared by combining an oil or fat phase and an aqueous phase. The desirable fat level in the final product can range from about 30–60%, and even more desirably about 35–50%.

Fat Components

Throughout this specification the terms oil and fat are used interchangeably. They are meant to include triglycerides from either vegetable or animal sources. Such vegetable triglycerides include soybean oil, sunflower oil, palm oil, palm kernel oil, both high and low erucic rapeseed oil, coconut oil, olive oil, sesame oil, peanut oil, corn oil and mixtures thereof.

Triglycerides from animal sources include fish oil, tallow, sardine oil, dairy fat and mixtures thereof.

The oils may be chemically, physically and/or genetically modified products such as hydrogenated, fractionated and/or inter-esterified triglyceride mixtures and mixtures of two or more thereof, as well as edible substances that are physically similar to triglycerides such as waxes, e.g. jojoba oil, and poly fatty acid esters mono- or disaccharides, that can be used as replacement for or in a mixture with triglycerides. Preferably, the fat contained in the present spreads consists essentially of triglycerides from a vegetable source, preferably physically or chemically modified or unmodified liquid oil and mixtures thereof.

The precise composition of the fat is dependent on the type of spread being made. Among the types of spreads that could be made are sticks and tub spreads. For organoleptic reasons, it is preferred to employ a fat that has a solid starch fat content at 35° C. of less than 5 wt. % (calculated on the weight of the fat), more preferably less than 3 wt. %. The solid fat content at 20° C. is suitably between 5 and 30 wt. %, preferably between 5 and 20 wt. %. At 5° C., the solid fat content is suitably between 5 and 50 wt. %, preferably between 10 and 40 wt. %.

The solid fat content can conveniently be determined by measuring the NMR N-value as described in Fette, Seifen, Anstrichmittel, 80 (1978), 180–186, which indicates the amount of fat present in the solid state expressed in percentage of the weight of the fat.

A typical triglyceride mixture that can suitably be used as fat in the present spread depends on the form of the final product such as stick, hard tub or soft tub. For example, a preferred fat mixture for a soft tub product may be a mixture of 20–90 wt. % liquid oil, (e.g. soybean oil) with 80–5 wt. % of a hardstock which is a mixture of randomly interesterified and/or hydrogenated oil.

The aqueous phase comprises from about 20 to about 40% water. The mean aqueous phase droplet size distribution (d3.3) of the dispersed aqueous phase in the final product is less than 10 microns preferably less than about 5 microns. The unit d3.3 is defined as the volume weighted mean of the droplet size distribution and can be determined as with NMR as described in J. C. van Enden et al Colloid and interface Science 140 (1990) pp. 105–113 and also described in U.S. Pat. No. 5,302,408 herein incorporated by reference. Such a droplet size is desirable to provide a microbiologically stabler product, and yet to provide a flavor release in the mouth when the product is eaten.

Process (covers the normal fat continuous process 30–60% fat)

The spread according to the invention is prepared as follows:

The fat and aqueous phases are mixed together at approximately 55° C. in a heated tank in a ratio of approximately 30–60 parts fat phase to 40–70 parts aqueous phase. This emulsion will be fat continuous. Aqueous phase is added to the fat phase to aid in obtaining a fat continuous emulsion in the tank.

The emulsion is then passed through a cooled, scraped-surface heat exchanger (A-unit) where the emulsion is cooled to a temperature where the fat will begin to crystallize (5–25° C., preferably 8–20° C.) and the aqueous phase will begin to gel, if the aqueous phase has the gelling agents, and/or there is increase in viscosity if only thickening agents are present in the aqueous phase.

The cooled emulsion may then be passed through the Cunit, crystallizer. The shaft speed may vary and depends on it's dimensions and the residence time required to crystallize the fat in line but normally varies from 100–900 RPM.

The fat continuous emulsion is passed into an additional cooling unit to reduce the temperature of the emulsion since there is a temperature rise due to heat of crystallization in the crystallizer.

Depending on the final product, for tub product, the cooled emulsion is passed through the crystallizer (C-Unit) to provide additional residence time and adjust the consistency for packaging in tub. For the stick product, the cooled emulsion may be passed through a B-Unit for additional residence time and increase the packing hardness for the product to be packed in the stick form.

Extra cooling capacity can be added to the process by including additional A-units before and after the crystallizer. Extra residence time can be added to the process by including additional C-units after the first cooling stage.

Another method known in the art which could be used for preparing compositions of the invention is the inversion process.

The following ingredients were used in the just above described process:

| DESCRIPTION OF THE MATERIALS USED | |
|---|---|
| INGREDIENT | DESCRIPTION |
| Oil blend | oil blend, combination of liquid bean oil and partially hydrogenated oil<br>N10 = 26–38<br>N20 = 15–20<br>N30 = 2–8<br>N35 = 0–2. |
| Myverol 1804 | distilled monoglyceride, Iodine Value 5, from Eastman Kodak |
| Lecithin | from Central Soy |
| Fibersol | Fibersol 2 (E) ®, Malodextrin from Matsutani Chemical Co., Japan |
| Color | a mixture of beta carotene and vitamin A from Roche |
| Flavor | butter flavor |

Using the above process, two compositions shown below were prepared. One composition (the control, which is not a composition of the invention, and which is referred to as COMPOSITION A) has 48% water. The other composition (COMPOSITION B), which is a composition of the invention, has 28% water and 20% Fibersol.

| COMPOSITION A[1] | |
|---|---|
| INGREDIENT | WEIGHT PERCENT |
| Oil blend | 49.5 |
| lecithin | 0.205 |
| distilled monoglyceride with an iodine value less than or equal to 5 | 0.3 |
| Flavor | 0.01 |
| Color | 0.0066 |
| Whey | 0.25 |

-continued

| COMPOSITION A[1] | |
|---|---|
| INGREDIENT | WEIGHT PERCENT |
| EDTA | 0.007 |
| Citric Acid | 0.03 |
| K Sorbate | 0.1 |
| Salt | 1.6 |
| Fibersol 2(E) ® | 0 |
| Water | to make it to 100% |

[1]Composition A has approximately 48% water.

The composition just below is a composition of the invention.

| COMPOSITION B | |
|---|---|
| INGREDIENT | WEIGHT PERCENT |
| Oil blend | 49.5 |
| lecithin | 0.205 |
| distilled monoglyceride with an iodine value less than or equal to 5 | 0.3 |
| Flavor | 0.01 |
| Color | 0.0066 |
| Whey | 0.25 |
| EDTA | 0.007 |
| Citric Acid | 0.03 |
| K Sorbate | 0.1 |
| Salt | 1.6 |
| Water | to make it to 100% |
| Fibersol 2(E) ® | 20 |

[1]Composition B has approximately 28% water.

COMPOSITION B as compared to COMPOSITION A is equal in cold mouthfeel properties and has unexpectedly superior baking properties.

We claim:

1. A fat continuous low fat spread comprising:
   (a) fat in the range of about 30–60%; and
   (a) an aqueous phase which is 40–70% of the composition said aqueous phase containing non-gelling hydrocolloids in the range of about 15–40% of the spread, wherein said non-gelling hydrocolloid is a maltodextrin of DE 6-10 processed from corn starch using hydrochloric acid and enzymes and wherein said maltodextrin is present at levels ranging from about 15 to about 40% and wherein the maltodextrin is partially digestible and wherein the maltodextrin Beta 1-2, Beta 1-3 and Beta 1-6 bonds of the maltodextrin are not digestible.

2. A fat continuous low fat spread comprising:
   a) fat in the range of about 30–60%; and
   b) an aqueous phase which is 40–70% of the composition, said aqueous phase containing nongelling hydrocolloids in the range of about 15–40% of the spread, wherein the aqueous phase has a viscosity at least about 5 to about 500 centipoise at a temperature of about 40 to about 50° C.

3. A fat continuous low fat spread comprising:
   a) fat in the range of about 30–60%; and
   b) an aqueous phase which is 40–70% of the composition, said aqueous phase containing nongelling hydrocolloids in the range of about 15–40% of the spread, wherein the aqueous phase has a viscosity at least about 5 to about 200 centipoise at a temperature of about 40 to about 50° C.

4. A fat continuous low fat spread comprising:
   a) fat in the range of about 30–60%; and
   b) an aqueous phase which is 40–70% of the composition, said aqueous phase containing nongelling hydrocolloids in the range of about 15–40% of the spread, wherein the mean aqueous phase droplet size distribution (d3.3) of the dispersed aqueous phase in the final product is less than 10 microns.

* * * * *